United States Patent
Madsen

(10) Patent No.: US 7,889,352 B2
(45) Date of Patent: Feb. 15, 2011

(54) INTEGRATED POLARIZATION BEAM SPLITTER WITH QUARTER-WAVE PLATE FOR POLARIMETER AND PMD COMPENSATION APPLICATIONS

(75) Inventor: Christi Kay Madsen, South Plainfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 211 days.

(21) Appl. No.: 11/668,841

(22) Filed: Jan. 30, 2007

(65) Prior Publication Data
US 2007/0296977 A1 Dec. 27, 2007

Related U.S. Application Data

(62) Division of application No. 10/458,440, filed on Jun. 10, 2003, now Pat. No. 7,228,037.

(51) Int. Cl.
*G01B 9/02* (2006.01)
(52) U.S. Cl. ..................................................... 356/491
(58) Field of Classification Search ................... 356/491
See application file for complete search history.

(56) References Cited

U.S. PATENT DOCUMENTS

| | | | |
|---|---|---|---|
| 4,429,573 A * | 2/1984 | Walker | 73/510 |
| 4,998,793 A | 3/1991 | Henry et al. | |
| 5,351,252 A * | 9/1994 | Toyama et al. | 372/29.021 |
| 5,537,671 A * | 7/1996 | Toyama et al. | 385/27 |
| 5,712,704 A * | 1/1998 | Martin et al. | 356/491 |
| 2002/0093643 A1* | 7/2002 | Moeller | 356/73.1 |
| 2003/0206676 A1* | 11/2003 | Ovadia et al. | 385/11 |
| 2004/0136649 A1* | 7/2004 | Mangir et al. | 385/27 |
| 2005/0002594 A1* | 1/2005 | Parker et al. | 385/11 |
| 2006/0033927 A1* | 2/2006 | Froggatt et al. | 356/484 |
| 2006/0165336 A1* | 7/2006 | Mangir et al. | 385/1 |
| 2006/0227331 A1* | 10/2006 | Vollmer et al. | 356/483 |

OTHER PUBLICATIONS

Saida et al: "Planar Lightwave Circuit Polarization Mode Dispersion Compensator," European Conference on Optical Communications, 2001, p. 4.
Madsen et al: "Optical Filter Architecture for Approximating Any 2×2 Unitary Matrix," Optics Lett., vol. 28, No. 7, pp. 534-536, 2003.
Y. Inoue et al.: "Polarization Mode Converter With Polymide Half Waveplate in Silica-Based Planar Lightwave Circuits," IEEE Photonics Technol. Lett., vol. 6, No. 5, pp. 626-628,1994.
Y. Shani et al.: "Polarization Rotation in Asymetric Periodic Loaded Rib Waveguides," Appl. Physics Letter, vol. 59, pp. 1278-1280, 1991.

(Continued)

*Primary Examiner*—Patrick J Connolly
(74) *Attorney, Agent, or Firm*—Ryan, Mason & Lewis, LLP

(57) ABSTRACT

An optical device for changing polarization comprises a waveguide having a waveguide end facet coupled to a quarter-wave plate/reflector combination to rotate the polarization of incident light to the waveguide by 90 degrees. In one embodiment, a polarization beam splitter/rotator combination (PBSR) uses a quarter-wave plate in reflection at the end facet of the waveguide. The polarization beam splitter/rotator combination and variations of that structure are applied in various useful topologies as polarization mode dispersion (PMD) compensators and polarimeters.

23 Claims, 5 Drawing Sheets

OTHER PUBLICATIONS

T. Koster et al.: "Passive Polarization Converter in Sion Technology," J. of Lightwave Technology, vol. 19, pp. 876-883, 2001.

B. Little et al.; "Theory of Polarization Rotation and Conversion in Vertically Coupled Microresonators," IEEE Photon. Technol. Lett., vol. 12, No. 4, pp. 401-403, 2000.

B. Rahman et al.: "Design and Characterization of Compact Single-Section Passive Polarization Rotator," J. Lightw. Technol., vol. 19, pp. 512-519, 2001.

M. Okuno et al.: "Birefingence Control of Silica Waveguides on Sl and its Application to a Polarization-Beam Splitter/Switch," J. of Lightw. Technol., vol. 12, No. 4, pp. 625-633, 1994.

P. Westbrook et al.: "In-Line Polarimeter Using Blazed Fiber Gratings," IEEE Photon. Technol Lett., vol. 12, No. 10, pp. 1352-1354, 2000.

T. Saida et al.: "Integrated Optical Polarisation Analyser on Planar Lightwave Circuit," Electron. Lett., vol. 35, No. 22, pp. 1948-1949, 1999.

T. Koster et al.: "Fully Integrated Optical Polarimeter," Sensors and Actuators B, vol. 82, pp. 213-226, 2002.

C. Madsen et al.: "High-Speed, Low-Power Thermo-Optic Phase Shifters," Bell Laboratories Internal Technical Memorandum, 2003, pp. ITD-03-44505A.

* cited by examiner

US 7,889,352 B2

INTEGRATED POLARIZATION BEAM SPLITTER WITH QUARTER-WAVE PLATE FOR POLARIMETER AND PMD COMPENSATION APPLICATIONS

CROSS REFERENCE TO RELATED APPLICATION

This application is a divisional of U.S. application Ser. No. 10/458,440, filed Jun. 10, 2003, now U.S. Pat. No. 7,228,037 the disclosure of which is incorporated by reference herein.

FIELD OF THE INVENTION

This invention relates a polarization beam splitter and quarter-wave plate combination that is particularly useful for polarization measurement and PMD compensation.

BACKGROUND OF THE INVENTION

High-speed optical fiber communication systems operate by encoding information (data) onto lightwaves that typically propagate along optical fiber paths. Most systems, especially those used for medium to long distance transmission, employ single mode fiber. As implied by the name, single mode fibers optimally propagate one mode of a lightwave. The single mode of light typically comprises many communications channels. The many communications channels are combined, or multiplexed into the one transmitted mode, as by wavelength division multiplexing (WDM) or dense wavelength division multiplexing (DWDM).

While there is only one mode transmitted, that single mode actually comprises two perpendicular (orthogonal) polarization components. These two components propagate at different speeds along a fiber transmission path, producing undesirable distortion of the optical signals referred to as polarization mode dispersion (PMD). PMD can be corrected in optical transmission systems using measurements of PMD to control active corrective optics.

Polarimeters measure the polarization of light, and PMD compensators correct dispersion. Polarimeters generate signals representing a measured state of polarization that can then be used for polarization correction. PMD compensators accomplish PMD correction based on the measured signals. These devices can be compactly fabricated as integrated structures on a substrate.

An important component in polarization measurement and polarization compensation is a component to modify the polarization of the light. This component is typically provided as a polyimide half waveplate inserted into a grove formed in a silica-based single mode waveguide. (See for example, "*Polarization Mode Converter with Polyimide Half Waveplate in Silica-Based Planar Lightwave Circuits,*" Y. Inoue, et al., IEEE Photonics Technology Letters, vol. 6, no. 5, pp. 626-628, 1994.) The waveplate is provided by dicing or etching a trench across a waveguide and then epoxying the half-wave plate in the gap. The difficulty with this approach is that the trench often cuts across other waveguides, adding unnecessary loss and backreflection. Also, typical polyimide half-wave plates have 40 micron widths. While, such widths are acceptable for low index waveguides, with high index waveguides the several decibel (dB) diffraction loss is not tolerable.

Accordingly there is a need for an improved component to modify the polarization of light, especially for use in polarization measurements and PMD compensators.

SUMMARY OF THE INVENTION

An optical device for changing polarization comprises a waveguide having a waveguide end facet coupled to a quarter-wave plate/reflector combination to rotate the polarization of incident light to the waveguide by 90 degrees. In one embodiment, a polarization beam splitter/rotator combination (PBSR) uses a quarter-wave plate in reflection at the end facet of the waveguide. The polarization beam splitter/rotator combination and variations of that structure are applied in various useful topologies as polarization mode dispersion (PMD) compensators and polarimeters.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention, and except for the graphs, are not to scale. It is also understood that many of the optical components shown in discrete form can be in integrated form, including integrated wave plates, polarizers, and mirrors as known in the art. Also, it is understood that where one phase shifter is shown in only one arm of a tunable coupler, MZI, or two parallel waveguides going into a coupler, a second phase shifter can be added to the other arm.

DETAILED DESCRIPTION OF THE INVENTION

The detailed description is divided into two parts. First, the inventive PBS/rotator structure is introduced. Part I shows PMD compensators using the inventive PBS/rotator structure. Part II discusses various polarimeter topologies, also using the inventive structure.

Part I: The PBS/Rotator Structure (PBSR)

Figure 1:
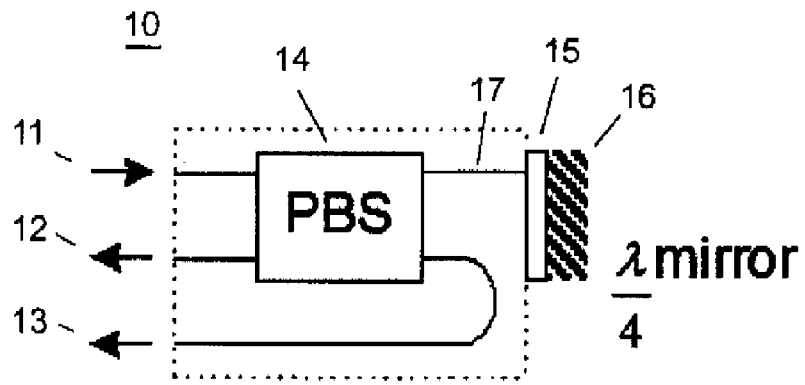
FIG. 1 shows a polarization beam splitter (PBS) plus quarter-wave reflector rotator configured as a PBSR.

FIG. 1 shows a new configuration 10 for a polarization beam splitter (PBS) plus rotator structure, referred to herein as "PBSR". Light is input to PBSR 10 at port 11 of 2×2 PBS 14. Quarter-wave plate 15 is coupled to the end facet of the waveguide 17, the through port of 2×2 PBS 14. A reflector 16, such as a mirror or Bragg Grating, is coupled to Quarter-wave plate 15. Quarter-wave plate 15 is oriented at about 45 degrees to the birefringent axis of waveguide 17. PBSR 10 outputs orthogonal polarizations at ports 12 and 13 as co-polarized light. The outputs are co-polarized because the double pass through quarter-wave plate 15 causes one polarization to be rotated by 90 degrees and delayed as compared to the other polarization. It is equivalent to a single pass transmission through a half-wave plate.

The use of a mirror at the end facet of waveguide 17 avoids the need for a trench and careful alignment of the waveplate in a trench. Such trenches often cut across other waveguides, adding unnecessary loss and backreflection. Quarter-wave plates 15 with 8 microns thickness are available, thus the double-pass distance is less than half that for the half-wave plate, substantially reducing diffraction losses, and the waveplate can easily be attached to the polished end facet of the waveguide without interfering with other waveguides on the circuit. Waveplate 15 can easily be attached to the polished end facet of waveguide 17 without interfering with other waveguides on the circuit, and final alignment of the axis of waveplate 15 relative to the birefringent axis of waveguide 17 can be more easily accomplished.

Figure 2:
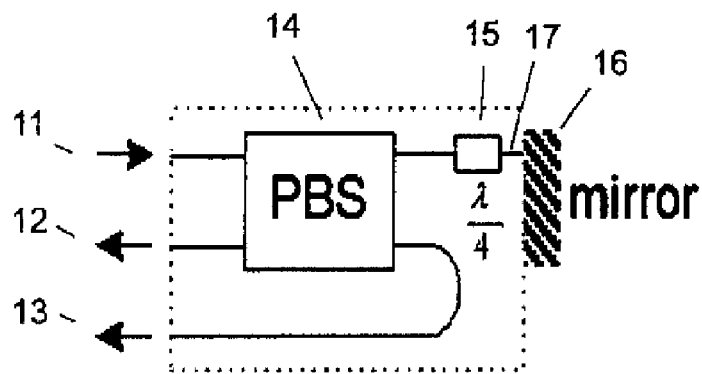
FIG. 2 shows a PBSR with an integrated quarter-wave plate and external reflector.

The one-input/two-output (1×2) PBSR is shown in integrated form, in FIG. 1, where the dotted box indicates the planar waveguide portion. It can also be operated in reverse (2×1). The optical path lengths of the two output ports are designed to be equal. Quarter-wave polarization rotator 15 can also be integrated as shown in FIG. 2. In this case, the tolerances on the rotation angle and equivalent waveplate thickness are greatly relieved by passing the signal back through PBS 14, with high extinction of the undesired polarization, after reflection.

Figure 3:
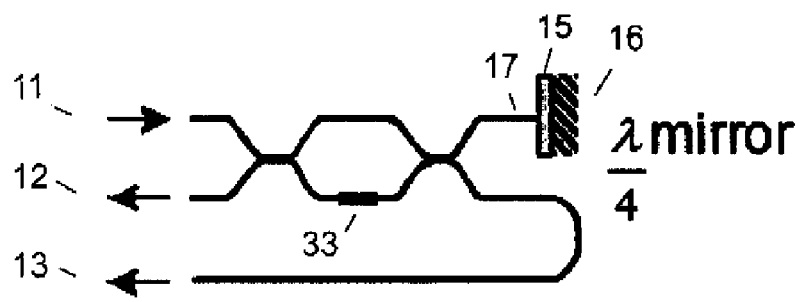
FIG. 3 shows an exemplary implementation of a 1×2 PBSR.

FIG. 3 is an exemplary implementation of a 1×2 PBSR. Light is input to the structure at PBS port 11. Orthogonal polarizations are output at PBS port 12 and cross-port 13. Light reflected by mirror 16 at the through port leading to waveguide 17 (with ½ λ rotation as a result of two passes through quarter-wave plate 15) crosses and exits at output 12. The orthogonal polarization is output at port 13. Mode transformers (not shown) can be used, for example, in waveguide 17 to reduce reflected light loss from the quarter-wave plate 15/reflector 16 combination. Tunable phase shift 33 can be used to adjust the delay between the two legs. The cross-port of a 1×2 PBS has a much higher extinction ratio than the thru port because the couplers are not exactly 50/50 splitters. This extinction ratio asymmetry is advantageously used in the double-pass configuration to improve the lower extinction port. The optical path lengths of the two output ports are designed to be equal.

Polarization Diversity Applications (PMD Compensators)

Figure 4:
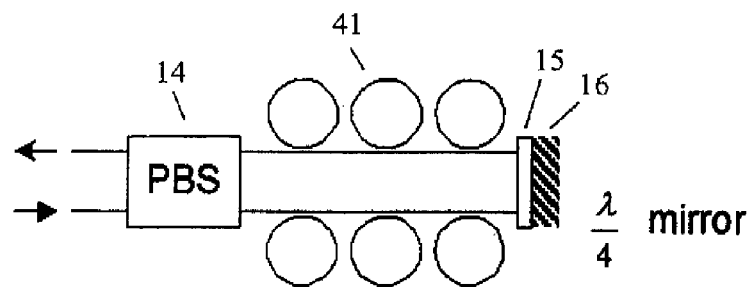
FIG. 4 shows an exemplary compensator using a PBS and quarter-wave plate/reflector combination.

An integrated PMD compensator and tunable chromatic dispersion compensator can be implemented comprising PBS 14 and a quarter-wave plate 15 reflector 16 combination, as shown in FIG. 4. The tunable allpass filters, shown as ring resonators 41, compensate dispersion and first-order PMD. The allpass filters are advantageously double-passed because of the light reflected from mirror 16 serving as a reflector.

It should be noted that if the birefringence is too large, the filter passbands will not overlap. In this case, a mirror can be used instead of the quarter-wave plate/reflector combination and a circulator is then needed to separate the input and output signals since they are not automatically separated, as is the case in FIG. 4.

Figures 5A, 5B:
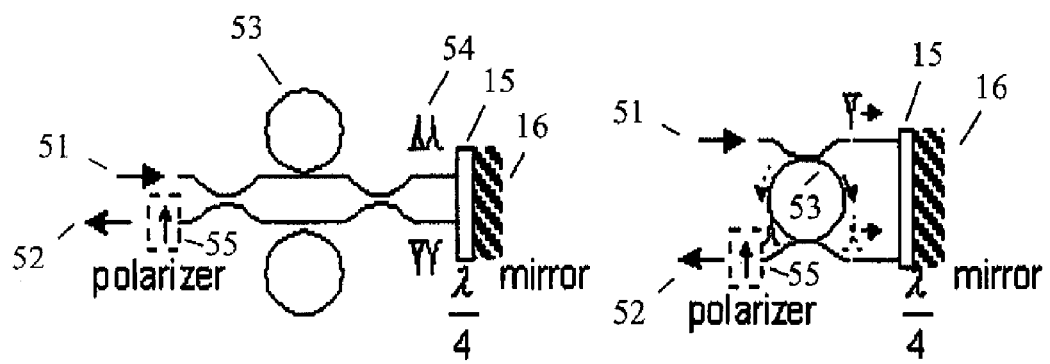
FIG. 5A shows one embodiment of a compensator using ring resonators and a PBS and quarter-wave plate/reflector combination.
FIG. 5B shows a second embodiment of a compensator using a ring resonator and a PBS and quarter-wave plate/reflector combination.

FIGS. 4, 5A and 5B show architectures suitable for birefringent narrowband filters, such as ring resonators 41 implemented in planar waveguides, with a quarter-wave plate 15 reflector 16. This type of filter allows the narrow bandpass responses from both polarizations to be combined at output 52. By placing polarizer 55 at the output, the TE or TM energy of the two frequencies represented as pulses 54 can be mixed on a photodetector (not shown). The beat frequency phase provides dispersion information. Thus, the birefringence provides a stable beat frequency as the narrowband filter is tuned. By varying the birefringence during fabrication, the beat frequency can be set. One fabrication technique is to ablate a stress-inducing film on top of the upper cladding until the desired birefringence is achieved.

Polarization State Generators and Analyzers (Polarimeters):

Polarimeters can be implemented with four detectors in a stationary architecture, or a single detector and a rotating waveplate, using the Stokes space representation. A Jones vector approach has been demonstrated in planar waveguides using four detectors ("Apparatus and method for measurement and adaptive control of polarization mode dispersion in optical fiber communications systems," U.S. patent application Ser. No. 10/180,842, by C. K. Madsen, which is incorporated by reference herein), or more than four detectors (See: T. Saida, et. al., "*Integrated Optical Polarisation Analyser on Planar Lightwave Circuit,*" Electronics Letters, vol. 35, no. 22, pp. 1948-1949, 1999). For sensing applications, a polarization-dependent interferometer has been integrated and referred to as a polarimeter; however, it does not function to evaluate the input state of polarization (SOP) as we are using the term polarimeter. A critical measurement for polarimeters used to provide feedback information to PMDCs is to determine the degree of polarization (DOP).

Figure 6:
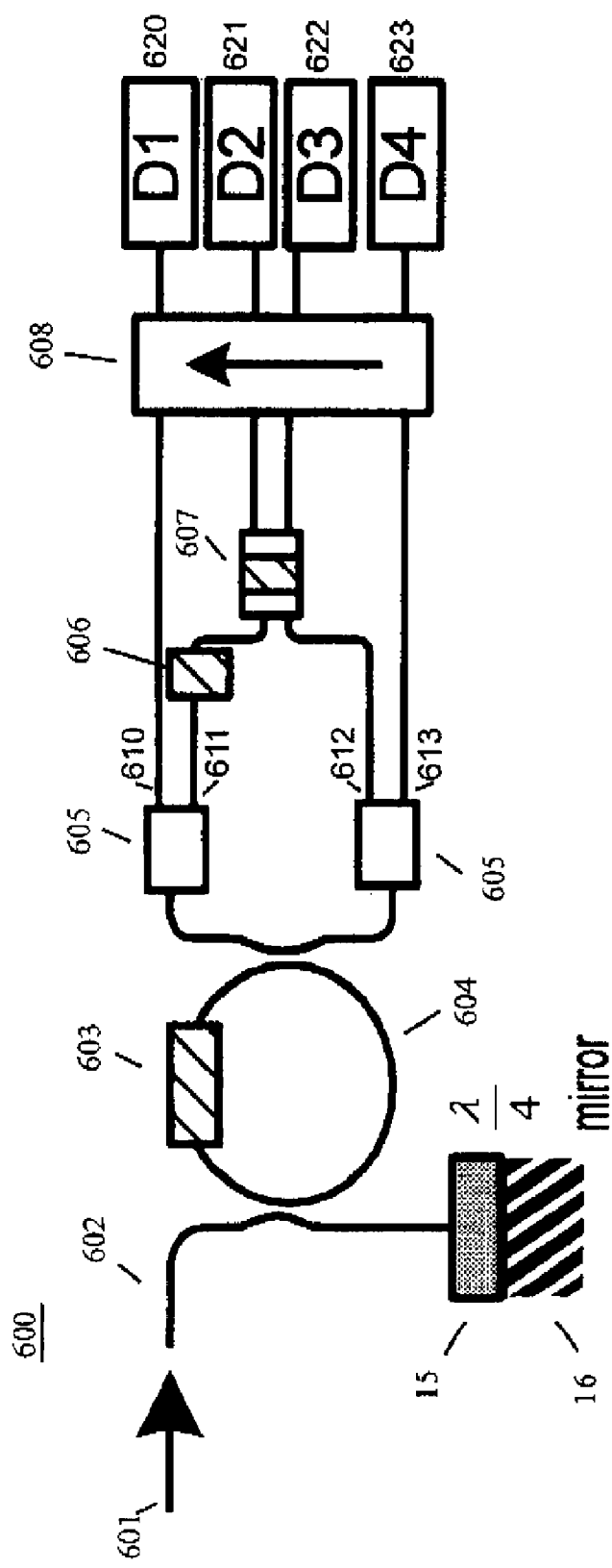
FIG. 6 shows one embodiment of a spectral polarimeter using a quarter-wave plate/reflector combination.

A spectral polarimeter 600 can be obtained without a PBS as shown in FIG. 6, but it requires 4×4 polarizer 608 at the outputs. Light to be measured for polarization is input at port 601. Some of the light in waveguide 602 is coupled directly into ring resonator 604, other light reflected from the quarter-wave plate 15 and mirror 16 is reflected back and also coupled into ring 604. Splitters 605 are used to create four light paths that are coupled directly, or indirectly to polarizer 608 and then to detectors D1 to D4. The topmost path 610 is coupled directly to polarizer 608 and then to detector D1. The next path 611 is coupled to phase shifter 606. Phase shifter 606 is coupled to tunable coupler 607, then coupled to polarizer 608 and output to detector D2. Path 612 is also coupled to tunable coupler 607, then coupled to polarizer 608 and output to detector D3. And, finally path 613 is coupled directly to polarizer 608 and output to detector D4. Note that the polarizer is aligned with the vertical or horizontal axis of the waveguides and may be implemented either externally or integrated. Phase shifters 603, 606 are used to tune the narrowband filter response and to change the relative phase between polarizations for more robust detection. Tunable coupler 607 may also be employed to further increase the measurement robustness for TE or TM input SOPs, which would not provide an interference signal otherwise.

Figure 7:
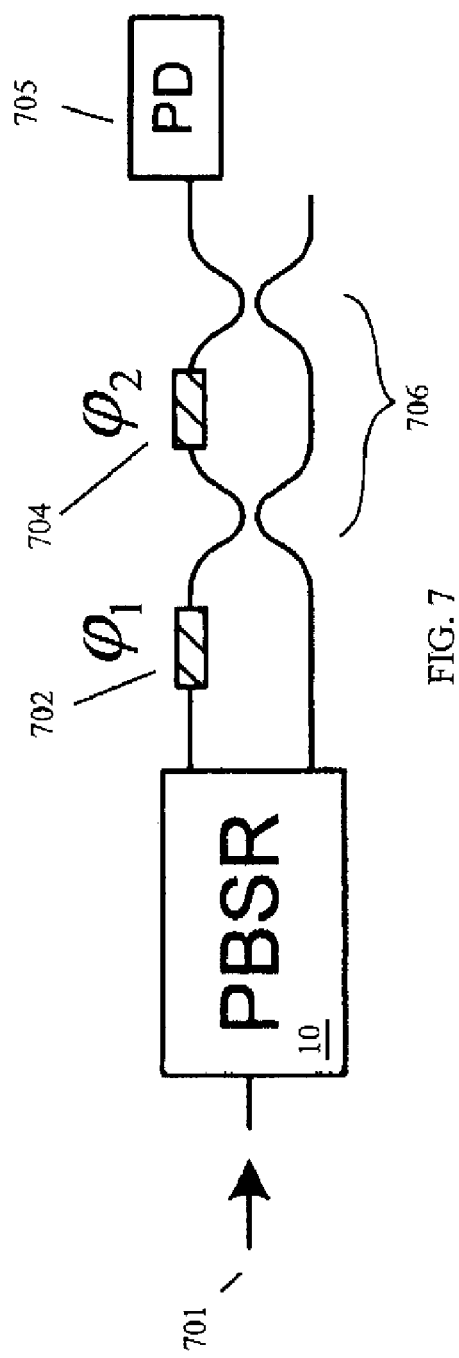
FIG. 7 shows an efficient polarimeter using a PBSR.

An efficient integrated polarimeter architecture that requires only a single detector is shown in FIG. 7. Incident light 701 is split by PBSR 10. The TE component is present on one arm of the PBSR and the TM component is present on the other PBSR arm. One of the components is rotated 90 degrees by the PBSR, therefore both components are co-polarized. Tunable phase shifter, $\phi_1$ 702, changes the relative phase in one arm. Then, both arms are combined in a tunable coupler, which is implemented using a symmetric Mach-Zehnder interferometer (MZI) 706 with tunable phase shifter $\phi_2$ 704. The output from one arm of the MZI is then detected by photodetector 705.

This integrated device is much simpler than the equivalent four-detector fiber device. It can easily be integrated with numerous other functions, and it relies on fabrication insensitive elements. Tuning can by heat, and the thermo-optic tuning speed can be greatly enhanced over typical millisecond responses by using high-index contrast waveguides. Several combinations of phase shifters and tunable couplers can be used. The only requirement is that the polarization state analyzer provides an invertible analysis matrix so that the incoming Stokes vector can be determined.

The equivalent Mueller matrix representation is a linear phase retarder of retardance $\phi_1$ 702, followed by a retarder oriented at −45 degrees having retardance $\phi_2$ 704. By detecting only a single output, we perform the equivalent operation of a polarizer followed by a detector. The Mueller matrix representation is given as follows:

$$S^{out} = P_0 R_{-45} R_0 S^{in} = \frac{1}{2}\begin{bmatrix} 1 & 1 & 0 & 0 \\ 1 & 1 & 0 & 0 \\ 0 & 0 & 0 & 0 \\ 0 & 0 & 0 & 0 \end{bmatrix} \begin{bmatrix} 1 & 0 & 0 & 0 \\ 0 & \cos\varphi_2 & 0 & \sin\varphi_2 \\ 0 & 0 & 1 & 0 \\ 0 & -\sin\varphi_2 & 0 & \cos\varphi_2 \end{bmatrix} \begin{bmatrix} 1 & 0 & 0 & 0 \\ 0 & 1 & 0 & 0 \\ 0 & 0 & \cos\varphi_1 & \sin\varphi_1 \\ 0 & 0 & -\sin\varphi_1 & \cos\varphi_1 \end{bmatrix} \begin{bmatrix} S_0 \\ S_1 \\ S_2 \\ S_3 \end{bmatrix}$$

The output intensity is given by $S_0^{out} = [S_0 + S_1 \cos\phi_2 - S_2 \sin\phi_1 \sin\phi_2 + S_3 \cos\phi_1 \sin\phi_2]/2$.

The outputs are determined by measuring four settings of the phase shifter, for example, $\phi_2=0$, $\phi_2=\pi$, $[\phi_2=\pi/2, \phi_1=0]$, $[\phi_2=-\pi/2, \phi_1=\pi/2]$. Linear combinations of these outputs allow the incoming Stokes vector to be retrieved. The DOP is then calculated in the standard manner: DOP= $\sqrt{S_1^2+S_2^2+S_3^2}/S_0$. A common drive can be used for both phase shifters with only a fixed amplitude and phase offset between the two phase shifters. For example, $-\pi/4 \leq \phi_1 \leq 3\pi/4$ and $0 \leq \phi_2 \leq 2\pi$. The required maximum phase shift differs by a factor of two and a $\pi/4$ offset is evident. For a linear phase change in time, the output is given by:

$$S_0^{out}(t) = \begin{bmatrix} S_0 + S_1\cos(2\pi t) - S_2\sin(\pi t - \frac{\pi}{4})\sin(2\pi t) + \\ S_3\cos(\pi t - \frac{\pi}{4})\sin(2\pi t) \end{bmatrix}/2.$$

In practice, the maximum phase change applied via thermo-optic phase shifters is limited because of power constraints. A triangular drive signal with $2\pi$ peak-to-peak phase change could be used to provide a full characterization of the input polarization twice per period. The relative phase shift can be fixed in the optical circuit or applied electrically. The device in FIG. 7 can also be operated in reverse as a polarization state generator. A light source (not shown) replaces the photodetector 705 and various polarization states are generated to the left of PBSR 10.

Figure 8:
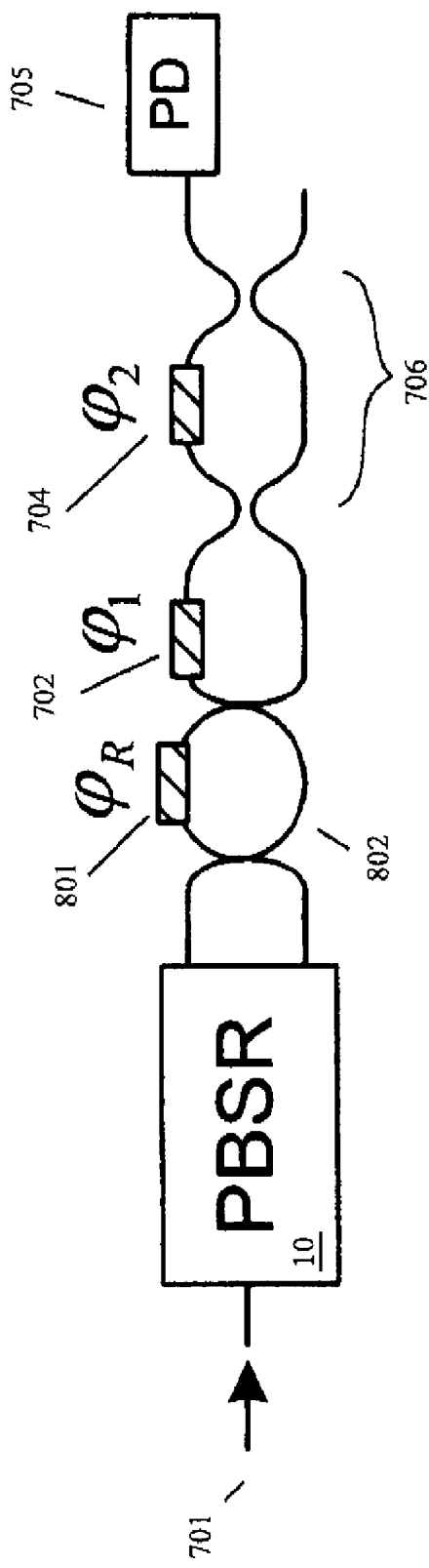
FIG. 8 shows another embodiment of an efficient spectral (wavelength dependent) polarimeter.

An integrated spectral (or wavelength-dependent) polarimeter architecture is shown in FIG. 8. The output of the PBSR 10 with a 90 degree rotation in one arm is coupled to one side of a tunable ring resonator 802, the narrowband filter, comprising phase shifter 801. The narrowband outputs are copolarized so that the birefringence of the waveguide does not matter. The outputs of the tunable narrowband filter are then operated on as in FIG. 7.

Figure 9:
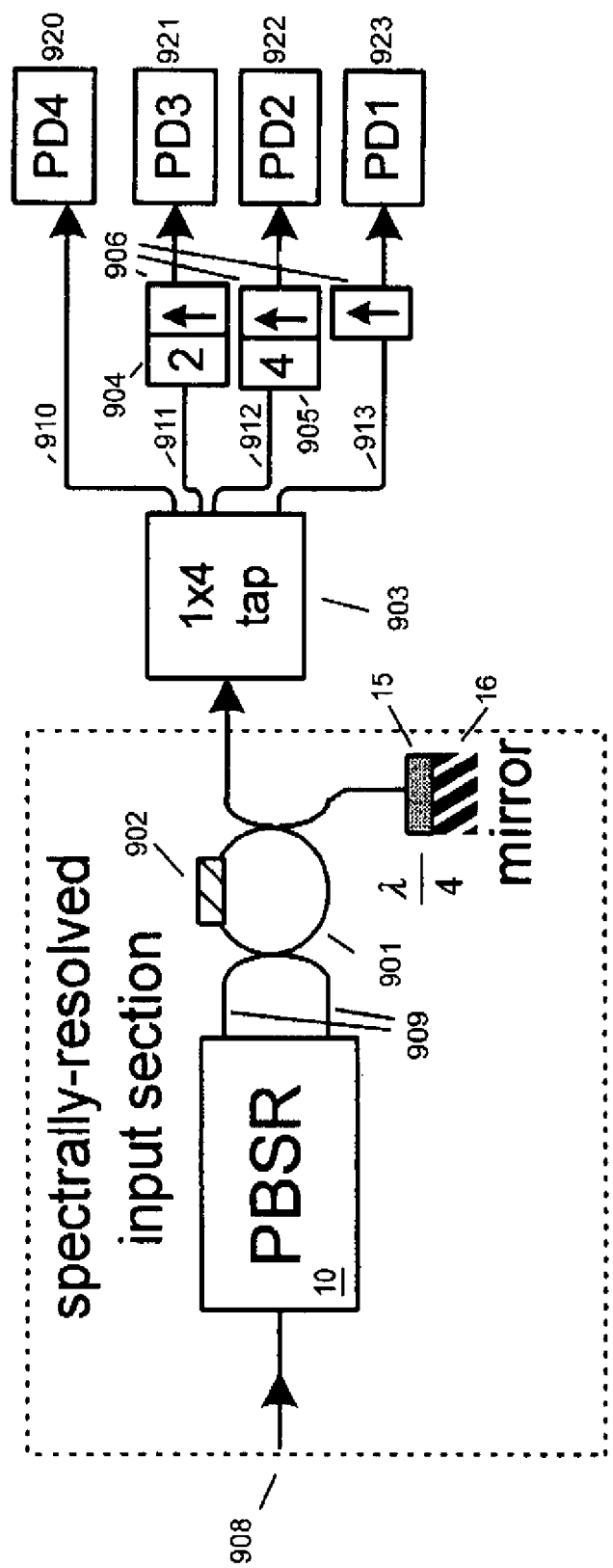
FIG. 9 shows an embodiment of Stokes polarimeter with spectrally-resolved input section.

The architecture in FIG. 9 realizes a Stokes polarimeter. Light 908 is input to PBSR 10. The outputs 909 of PBSR 10 are coupled to ring 901 comprising phase shifter 902. Ring 901 is coupled to a quarter-wave plate 15 and reflector 16, and a waveguide coupled to 1×4 tap 903. The four outputs of the 1×4 tap 903 are coupled via different waveguides to detectors 920-923. One tap 903 output is coupled via waveguide 910 to detector PD4 920. A second tap 903 output is coupled via waveguide 911 to waveplate 904 and a polarizer 906, and polarizer 906 is coupled to a detector PD3 921. Another tap 903 output is coupled via waveguide 912 to waveplate 905 and a polarizer 906, and the polarizer 906 is coupled to detector PD2 922. The fourth tap 903 output is coupled to a polarizer 906 and to detector PD1 923. The polarimeter has two (or three) waveplates 904 and 905 and three (or four) linear polarizers 906 that can easily be integrated. Two waveplates can be a quarter—905 and a half-wave plate 904 as shown. However, it is not necessary to precisely implement these values. Any polarization rotations, produced for example by polarization converters, which allow the overall characterization matrix to be inverted, are sufficient. Spectral resolution capability can be included as shown in the dashed box.

What is claimed is:

1. A tunable chromatic and polarization mode dispersion compensator for compensating incident light comprising:
    a polarization beam splitter (PBS) having, an input port for receiving incident light, a through port, a cross port, and an output port;
    a first series cascade comprising a plurality of ring resonators coupled to the through port and having a first cascade end;
    a second series cascade comprising a plurality of ring resonators coupled to the cross port and having a second cascade end;
    a quarter-wave plate/reflector combination coupled to the first cascade end and the second cascade end, the quarter-wave plate/reflector combination receiving light from the respective cascade ends and reflecting the light back into the ends such that the light traverses each cascade twice.

2. The compensator of claim 1 wherein the ring resonators are frequency dependent filters.

3. The compensator of claim 1 wherein the reflector is a mirror.

4. The compensator of claim 1 wherein the PBS is an integrated optical device.

5. The compensator of claim 1 wherein the entire structure is an optical integrated device.

6. A polarization mode dispersion (PMD) compensator for compensating incident light having a first polarization component and a second orthogonal polarization component comprising:
    a Mach-Zehnder interferometer (MZI) comprising at least two legs and having an input port, a through port, a cross port, and an output port, each leg comprising a ring resonator;
    a quarter-wave plate/reflector combination coupled to the through port and the cross port; and
    a polarizer coupled to the output port.

7. A polarization mode dispersion (PMD) compensator for compensating incident light having a first orthogonal polarization component and a second orthogonal polarization component comprising:
    a ring resonator;
    a first optical coupler coupled to the ring resonator, the first coupler further having at least two ports;

a second optical coupler coupled to the ring resonator, the second coupler having at least two ports;

a quarter-wave plate/reflector combination optically coupled to at least one port of the first coupler and at least one port of the second coupler;

a polarizer optically coupled to at least one port of the second coupler; and a photodetector optically coupled to the polarizer.

8. A method of measuring polarization mode dispersion, comprising the steps of:

receiving light having two orthogonal polarization components;

separating the two orthogonal components;

copolarizing the two orthogonal components; and mixing the copolarized components on a photodetector to generate a beat signal.

9. A method of compensation comprising the steps of measuring in accordance with claim 8 and further comprising the method step of varying a birefringence of at least one ring resonator during fabrication to set a beat signal generation frequency.

10. The method of claim 9 further comprising the method step of ablating the outer cladding of the at least one ring resonator during fabrication to set the birefringence.

11. A spectral polarimeter to measure the polarization of light comprising:

an input coupler having a first port and a second port, the first port for receiving the light;

a quarter-wave/reflector combination coupled to the second port;

a ring resonator coupled to the input coupler between the first port and the second port, the ring resonator having a tunable phase shift;

a second coupler having a first port and a second port, the second coupler coupled to the ring resonator between the second coupler first port and the second coupler second port;

a first splitter coupled to the second coupler first port, the first splitter having a first splitter first port and a first splitter second port;

a second splitter coupled to the second coupler second port, the second splitter having a second splitter first port and a second splitter second port;

a phase shifter coupled to the first splitter second port;

a 2×2 tunable coupler coupled to the phase shifter and the second splitter first port;

a 4×4 polarizer coupled to the first splitter first port, the two 2×2 tunable coupler, and the second splitter second port, and one or more detectors coupled to the polarizer.

12. A polarimeter to measure the polarization of light having two orthogonal polarization components comprising:

a polarization beam splitter/rotator (PBSR) to receive the light at a PBSR input and to separate the orthogonal polarization components, the PBSR having a first PBSR output and a second PBSR output, each of the PBSR outputs transmitting one of the separated polarization components, wherein the two orthogonal polarization components are copolarized as presented at the PBSR outputs;

a first tunable phase shifter coupled to the first PBSR output;

a Mach-Zehnder interferometer (MZI) coupled to a single photodetector, the MZI having a first input port, a second input port, a through port, and a cross port, the first input port coupled to the phase shifter, the second input port coupled to the second PBSR output, the through port coupled to the single photodetector, the cross port optionally having no connection, the MZI having two arms, with one arm having a second tunable phase shifter.

13. The polarimeter of claim 12 wherein the phase shifters are heat tunable.

14. The polarimeter of claim 12 wherein the phase shifters are tunable to a series of discrete phase shifts.

15. The polarimeter of claim 12 wherein the phase shifters are tunable to a series of discrete phase shifts by a common control signal.

16. The polarimeter of claim 12 wherein the phase shifters are continuously tunable.

17. The polarimeter of claim 16 wherein the phase shifters are continuously tunable by a triangle wave control signal.

18. The polarimeter of claim 12 wherein the photodetector readings provide the elements of an invertible matrix for the determination of a Stokes vector.

19. A polarimeter to measure the polarization of light having two orthogonal polarization components comprising:

a polarization beam splitter/rotator (PBSR) to receive the light at a PBSR input and to separate the orthogonal polarization components, the PBSR having a first PBSR output and a second PBSR output, each of the PBSR outputs transmitting one of the separated polarization components, wherein the two orthogonal polarization components are copolarized as presented at the PBSR outputs;

a first tunable phase shifter coupled to the first PBSR output;

a Mach-Zehnder interferometer (MZI) having a first input port, a second input port, a through port, and a cross port, the first input port coupled to the phase shifter, the second input port coupled to the second PBSR output, the through port coupled to a photodetector, the cross port optionally having no connection, the MZI having two arms, with one arm having a second tunable phase shifter;

the polarimeter further comprising between the PBSR and the first phase shifter and interferometer:

a first two port coupler having a first port and a second port, the first two port coupler first port and the first two port coupler second port coupled to the first PBSR output and the second PBSR output;

a ring resonator, coupled to the first two port coupler between the first port and the second port, the ring resonator comprising a third phase shifter; and a second two port coupler having a first port and a second port, coupled to the ring resonator between the first port and the second port, the second two port coupler first port coupled to the first phase shifter, and the second two port coupler second port connected to the second input port of the MZI.

20. A polarization state generator comprising:

a light source;

a Mach-Zehnder interferometer (MZI) having a first input port, a through port, a cross port, and a second input port, the MZI first input port optically coupled to the light source, the second input port optionally having no connection, and the MZI having two legs, wherein at least one leg comprises a phase shifter;

a second phase shifter optically coupled to the through port of the MZI; and a polarization beam splitter/rotator (PBSR) having a first input and a second input and one output, the first input optically coupled to the second phase shifter, the second input optically coupled to the cross port of the MZI, wherein polarized light is presented at the PBSR output.

21. A method of optical polarimetry to measure the polarization of light having two orthogonal polarization components, comprising the steps of:
receiving the light to be measured;
separating the light to be measured into its orthogonal polarization components;
copolarizing the orthogonal polarization components;
shifting one of the components in phase;
interfering one of the components with the other in a Mach-Zhender interferometer (MZI) having a phase shifter in one arm;
detecting the output of the MZI with a single photodetector to obtain a plurality of photodetector readings at a plurality of settings of the phase shifters; and
calculating the polarization from the photodetector readings.

22. The method of claim 21 wherein the step of calculating comprises presenting the photodetector readings as the elements of an invertible matrix to determine a Stokes vector.

23. A Stokes polarimeter for measuring the polarization of incident light comprising:
a polarization beam splitter/rotator (PBSR), the PBSR having an input and a first and second output, the PBSR receiving the incident light at the input and splitting the light into a first orthogonal polarization component at the first output, and a second orthogonal polarization component at the second output;
a first coupler having a first port and a second port, the first port coupled to the first PBSR output, and the second port connected to the second PBSR output;
a ring resonator, the ring coupled to the first coupler between the first port and the second port, the ring comprising a phase shifter;
a second coupler having a second coupler first port and a second coupler second port;
a quarter-wave plate/reflector combination coupled to the second coupler, second port;
a 1×4 tap coupled to the second coupler first port, the 1×4 tap having a first output, a second output, a third output, and a fourth output;
a first photodetector coupled to the tap first output;
a half-wave plate coupled to the tap second output;
a polarizer coupled to the half-wave plate;
a second photodetector coupled to the polarizer;
a quarter-wave plate coupled to the tap third output;
a second polarizer coupled to the quarter-wave plate;
a third photodetector coupled to the second polarizer;
a third polarizer coupled to the tap fourth output; and
a fourth photodetector coupled to the third polarizer
wherein the four photodetector signals yield four Stokes parameters of the polarization measurement.

* * * * *